United States Patent
Gao et al.

(10) Patent No.: US 8,484,983 B2
(45) Date of Patent: Jul. 16, 2013

(54) THERMOELECTRIC GENERATOR ON AN AIRCRAFT BLEED SYSTEM

(75) Inventors: Lijun Gao, Renton, WA (US); Shengyi Liu, Sammamish, WA (US); Chin-Hsi Chien, Bellevue, WA (US)

(73) Assignee: The Boeing Company, Chicago, IL (US)

(*) Notice: Subject to any disclaimer, the term of this patent is extended or adjusted under 35 U.S.C. 154(b) by 649 days.

(21) Appl. No.: 12/632,250

(22) Filed: Dec. 7, 2009

(65) Prior Publication Data
US 2011/0131999 A1    Jun. 9, 2011

(51) Int. Cl.
*F02C 6/06* (2006.01)
(52) U.S. Cl.
USPC .............................. 60/785; 60/266
(58) Field of Classification Search
CPC ...................... F02C 6/06; F02C 6/08
USPC ............. 60/782, 784–785, 226.1–226.3, 262, 60/264, 266, 767
See application file for complete search history.

(56) References Cited

U.S. PATENT DOCUMENTS

| | | | |
|---|---|---|---|
| 4,819,425 A * | 4/1989 | Farquhar et al. | 60/226.1 |
| 7,152,635 B2 * | 12/2006 | Moravec et al. | 141/64 |
| 2004/0139751 A1 | 7/2004 | Liu | |
| 2005/0022855 A1 | 2/2005 | Raver | |
| 2009/0014593 A1 * | 1/2009 | Westenberger et al. | 244/209 |
| 2009/0151321 A1 | 6/2009 | Jarmon | |
| 2009/0159110 A1 | 6/2009 | Kwok | |

FOREIGN PATENT DOCUMENTS

| | | |
|---|---|---|
| EP | 2147860 | 1/2010 |
| WO | WO2008030097 | 3/2008 |

* cited by examiner

*Primary Examiner* — Andrew Nguyen
(74) *Attorney, Agent, or Firm* — Weiss & Moy, P.C.

(57) ABSTRACT

A device for producing electrical power has a thermoelectric device coupled to an aircraft bleed system for generating electrical power using temperature differentials between ram air and bleed air. A system control is coupled to the ram air and the bleed air to control a temperature of the bleed air and to control a temperature gradient of the thermoelectric device.

17 Claims, 10 Drawing Sheets

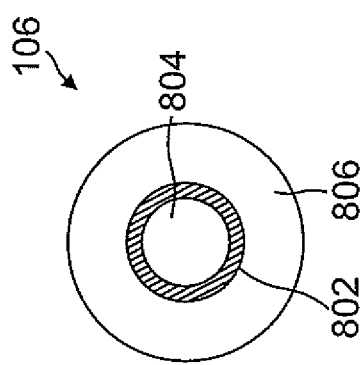
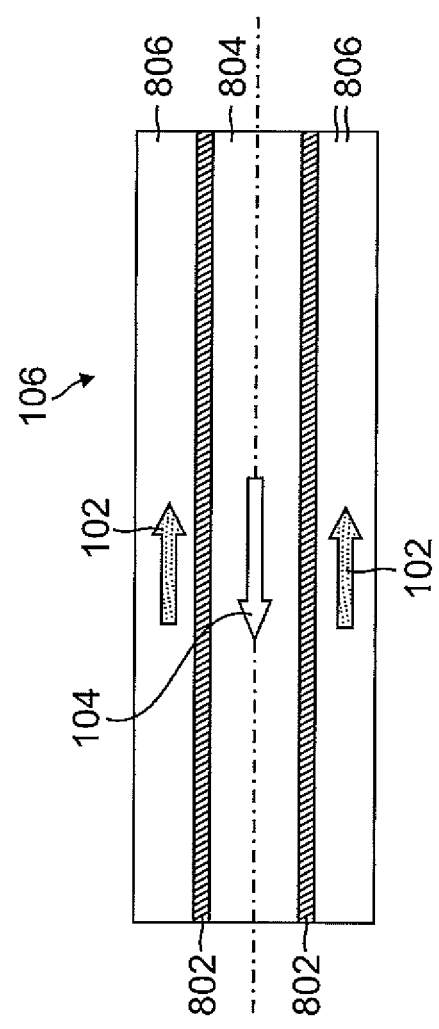

US 8,484,983 B2

THERMOELECTRIC GENERATOR ON AN AIRCRAFT BLEED SYSTEM

TECHNICAL FIELD

This application generally relates to power systems, and, more particularly, to the integration of a thermoelectric device into an aircraft bleed system for producing electrical power while reducing ram air intake.

BACKGROUND

Bleed air may be used by many systems on an aircraft. For example, in a nitrogen generation system, bleed air may be used for nitrogen generation to inert fuel tanks to remove potential hazardous situations arising from combustible combinations of oxygen, fuel vapors, and ignition sources. In operation, the nitrogen generation system may extracts bleed air and cool its temperature through the use of outside ram air within an air-to-air exchanger. In the process of cooling the temperature of the bleed air, waste heat may be expelled with exhaust. The regulated air may then be supplied to a pressurized chamber, such as an air separation stage, where the air exhaust from the pressurized chamber or air drawn out of the pressurized chamber may be separated into nitrogen enriched air and oxygen enriched air. The nitrogen enriched air may thereafter be supplied to the fuel tanks.

Ram air may be utilized as a coolant within the air-to-air heat exchanger. The aircraft may utilize ram air induction systems to capture air as a function of the movement of the aircraft. The air may be channeled through conduits which lead to the air-to-air heat exchanger. If the ram air induction is designed properly, when the aircraft is in motion, sufficient airflow may be provided to the air-to-air heat exchanger as the aircraft travels through an air medium.

Air drag may directly affect the amount of energy used to overcome the amount of resistance produced by the air drag. Consequently, when more ram air is taken in for cooling bleed air, the greater the drag placed upon the aircraft.

Therefore, a need exists to provide a system and method to overcome the above issues.

SUMMARY

A device for producing electric power comprising: a bleed air system; and a thermoelectric device coupled to the bleed air system for generating the electrical power using temperature differentials between ram air and bleed air.

A method for generating power on an aircraft bleed system comprising: receiving ram air; receiving bleed air; and directing the ram air and the bleed air through a thermoelectric cell coupled to the aircraft bleed system for generating electrical energy A system comprising a thermoelectric device with an air-to-air heat exchanger receiving bleed air, wherein said thermoelectric device produces electrical energy from a temperature difference between said bleed air and ram air while cooling said bleed air The features, functions, and advantages can be achieved independently in various embodiments of the disclosure or may be combined in yet other embodiments.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

FIG. 8A depicts a front view of a thermoelectric generator in accordance with one embodiment;

FIG. 8B is a sectional side view of the thermoelectric generator in accordance with one embodiment;

DESCRIPTION OF THE APPLICATION

The description set forth below in connection with the appended drawings is intended as a description of presently preferred embodiments of the application and is not intended to represent the only forms in which the present application may be constructed and/or utilized. The description sets forth the functions and the sequence of steps for constructing and operating the application in connection with the illustrated embodiments. It is to be understood, however, that the same or equivalent functions and sequences may be accomplished by different embodiments that are also intended to be encompassed within the spirit and scope of this application.

Figure 1:
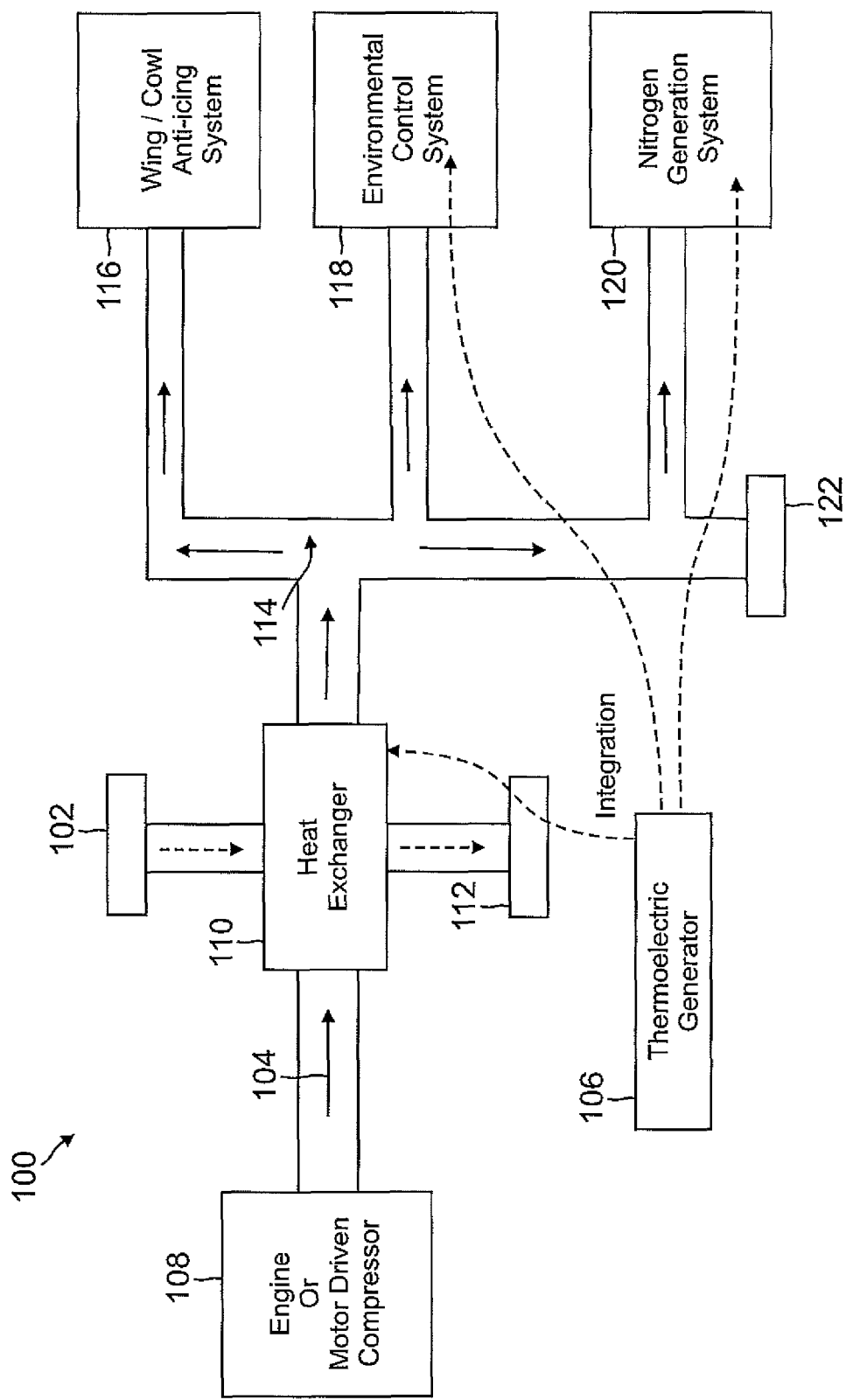
FIG. 1 shows a typical aircraft bleed system.

FIG. 1 shows a typical aircraft bleed air system 100 where multiple locations may be identified for thermoelectric generation. As provided for, the aircraft bleed system 100 may typically include an engine or motor driven compressor 108, a heat exchanger 110, an exhaust 112, a bleed air duct 114, a wing/cowl anti-icing system 116, an environmental control system 118, a nitrogen generation system 120, and other systems 122 that may use bleed air 104. A thermoelectric generator 106 may be integrated into a variety of locations or positions within the aircraft bleed system 100 to generate electrical energy such as, but not limited to, the heat-exchanger 110, the environmental control system 118, and nitrogen generation system 120. The thermoelectric generator 106 may be coupled to other locations within or outside the aircraft bleed system 100 where a temperature difference may be maintained so that the electrical energy may be produced. One skilled in the relevant art will appreciate that the aircraft bleed system 100 may contain more or less components and that FIG. 1 is provided for illustrative purposes.

Bleed air 104 may contain thermal energy that may be converted into useful electrical energy through thermoelectric generator 106. As shown, the bleed air 104 may come from the engine or motor driven compressor 108. Typically, the engine may produce bleed air 104 within its gas turbines generally after the compressor stage and before fuel is injected into the burners. Bleed air 104 often has a high pressure and high temperature.

The heat-exchanger 110 may receive the bleed air 104 from the engine or motor driven compressor 108. The heat-exchanger 110 may then cool the bleed air 104 typically using ram air 102. As shown, the thermoelectric generator 106 may be implemented within the heat-exchanger 110 to generate electrical energy taking advantage of the hot bleed air 104 and the cool ram air 102 provided thereto.

Generally, however, the bleed air 104 may be provided to systems within the aircraft bleed system 100 using bleed air duct 114. In one embodiment, the bleed air 104 may be provided to the wing/cowl anti-icing system 116. Typically, the wing/cowl anti-icing system 116 may be designed to keep atmospheric ice from accumulating on flight surfaces, which may ultimately disrupt the airflow across the wings or other surface.

The bleed air 104 may also be circulated to an environmental control system 118, which takes the bleed air 104 and delivers it to the cabin in the form of fresh, conditioned air for on-board passengers. In one embodiment, the bleed air 104 from the heat-exchanger 110 is further cooled down through an air conditioner on the environmental control system 118.

As described above, the thermoelectric generator 106 may be placed on the environmental control system 118 to generate electrical energy. Using bleed air 104 and ram air 102 channeled through the bleed air duct 114, electrical energy may be produced using the temperature gradient between the two.

The bleed air 104 may also be provided to other systems 122, some which may produce electrical energy using a thermoelectric generator 106. In one example, the bleed air 104 may be used for pneumatic actuators. One skilled in the relevant art will appreciate that there are a variety of applications in which bleed air 104 may be used and those presented above do not limit the scope of the present application.

Figure 2:
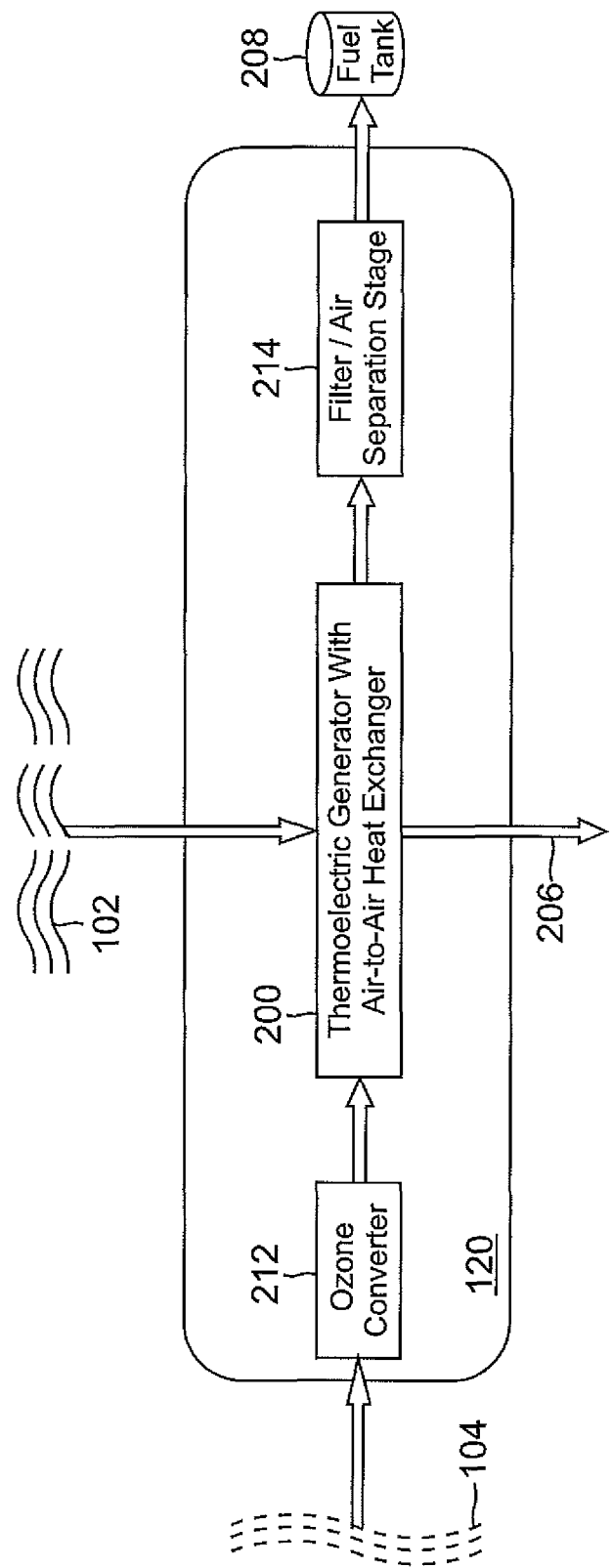
FIG. 2 depicts a block diagram representing components of an illustrative nitrogen generation system having a thermoelectric generator with air-to-air heat exchanger in accordance with one embodiment.

As shown, and in one embodiment, the bleed air 104 may be provided to a nitrogen generation system 120. FIG. 2 depict an exemplary block diagram representing typical components of an illustrative nitrogen generation system 120 having a thermoelectric generator with air-to-air heat exchanger 200 in accordance with one embodiment. While the current embodiment depicts the thermoelectric generator coupled to the air-to-air heat exchanger, multiple configurations may be used. For example, the thermoelectric generator may be outside of the nitrogen generation system 120 and separate from the air-to-air heat exchanger. In one alternative, conduits may be positioned so that the thermoelectric generator 106 does not have to be near the air-to-air heat exchanger. Details regarding the thermoelectric generator 106 with the air-to-air heat exchanger 200 will be described in more detail below.

The nitrogen generation system 120 may receive ram air 102 and bleed air 104 and expel ram air exhaust 206 and provide nitrogen enriched air to a fuel tank 208. Ram air 102 generally refers to cool or cold air and is represented by longer lines as shown in FIG. 2. Ram air 102, in one embodiment, may be taken at 0° C. or below 0° C. at an aircraft cruising altitude on a typical hot day. Cool ram air 102, as will be shown below, may be used to create a temperature difference for a thermoelectric generator 106 to generate useful electric power.

Ram air 102 may be received through intakes on the aircraft. In one embodiment, the ram air may be introduced from a ram scoop. It may be recognized that ram air 102 may be taken from a variety of sources and is not limited to the ram air intake described above. Cool air may be substituted for or simultaneously refer to ram air 102.

As will be shown, the bleed air 104 may be cooled using ram air 102 in order to filter and separate the air into nitrogen and oxygen by the nitrogen generation system 120. Bleed air 104 often contains a portion of waste heat. Thermoelectric generation using the waste heat contained in bleed air 104 or nitrogen system does not in general increase the extraction of bleed air 104.

Bleed air 104, represented as dotted lines within FIG. 2, is generally air received from an engine compressor or an independent motor driven compressor 108. Using the ram air 102 and bleed air 104, a temperature differential is produced which may allow the thermoelectric generator 106 to produce electrical power.

In most embodiments, the nitrogen generation system 120 is connected to the aircraft fuel tank 208. Because nitrogen enriched air has an inerting function for fuel tanks, it may stabilize the fuel tank 108 from unwanted hazards.

Within the nitrogen generation system 120, may be the ozone converter 212, the thermoelectric generator with air-to-air heat exchanger 200, and the filter/air separation stage 214. As shown in FIG. 2, the ozone converter 212 may receive incoming bleed air 104 before the thermoelectric generator with air-to-air heat exchanger 200.

Bleed air 104 from the ozone converter 212 may be fed into the thermoelectric generator with the air-to-air heat exchanger 200. The thermoelectric generator 106 may produce electrical energy using the temperature differential of the ram air 102 and the bleed air 104. In addition, the air-to-air heat exchanger cools or lowers the temperature of the bleed air 104 using the ram air 102. Cooling the air down allows it to be used by other systems within the aircraft. In one embodiment, the temperature of the cooled bleed air 104 is 85° C. A portion of the ram air 102 used to cool the bleed air 104 may be expelled through the ram air exhaust 206.

Cooled bleed air 104 may then be sent to the filter/air separation stage 214. The filter/air separation stage 214 may separate nitrogen and oxygen enriched fractions from the cooled bleed air 104. There are numerous ways to separate the nitrogen and oxygen from each other known to those skilled in the relevant art. Nitrogen enriched air may then be sent to the fuel tank 208.

While several components were described in FIG. 2, one skilled in the relevant art will appreciate that fewer or additional parts may be placed within the nitrogen generation system 120. The above-described nitrogen generation system 120 is for illustrative purposes and should not be construed as limiting to the scope of the present application.

In essence, the thermoelectric generator 106 integrated into the nitrogen generation system 110 may convert waste heat into electrical power. In one embodiment, the thermoelectric generator may provide electrical power about 10% of the waste heat carried in bleed air. This may be limited by the efficiency of the thermoelectric device. The thermoelectric device may also reduce the ram air 102 used to cool the bleed air 104. When less ram air 102 is used, the aircraft air drag may also be reduced.

Figure 3:
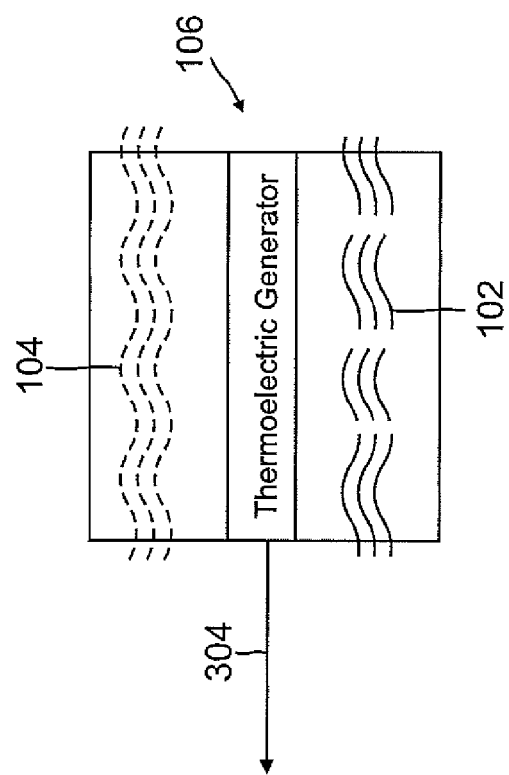
FIG. 3 is a pictorial representation of the thermoelectric generator with air-to-air heat exchanger receiving bleed air and ram air to produce electrical energy in accordance with one embodiment.

In previous nitrogen generation systems 120, when bleed air 104 was cooled, heat content carried by the bleed air 104 was disposed through the ram air 102 cooling process. As shown in FIG. 3, by coupling the thermoelectric generator 106 to the nitrogen generation system 120, or to the other systems provided above, the thermoelectric generator 106 may produce electrical power 304 using the bleed air 104 taking advantage of the heat that would have otherwise been wasted. By passing the ram air 102 on one side of the thermoelectric generator 106 and bleed air 104 on the other, electrical power 304 is produced by the thermoelectric generator 106.

The thermoelectric generator 106 may be a solid state power generation device. Typically, the generator 106 is compact, quiet, and very robust. Because of the lack of moving parts and its simplicity, the generator 106 may be low maintenance. Furthermore, the generator 106 may offer weight, volume, and cost savings for the aircraft power system.

Generally, the direction of the air flow of either the ram air 102 or the bleed air 104 does not affect the principle operation of the thermoelectric generator 106 as the thermoelectric generator 106 merely takes the differences in temperature between the two to generate electrical power 304. In some embodiments, however, the air flow direction may affect overall energy conversion efficiency. As provided for in FIG. 3 and consistent with FIG. 2, the ram air 102 is represented by longer lines and the bleed air 104 is depicted using dotted lines.

Figure 4:
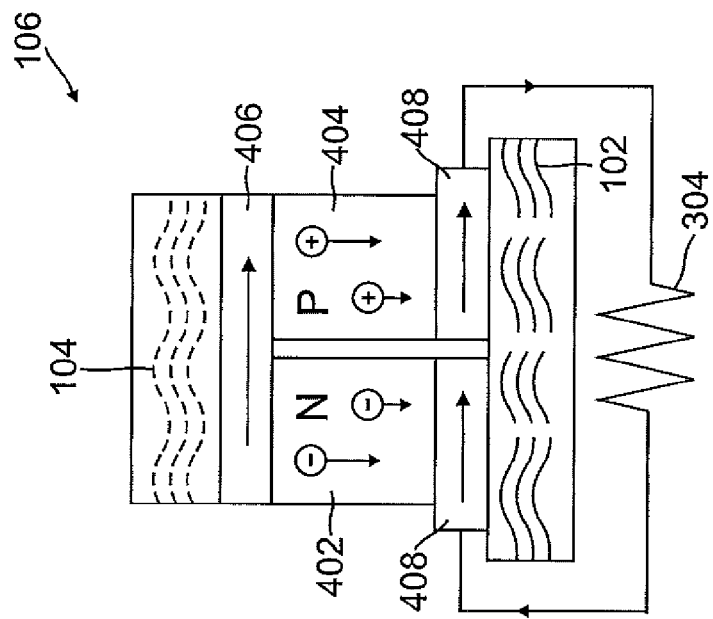
FIG. 4 depicts a thermoelectric generator in accordance with one embodiment.

For illustrative purposes, and not limiting the presented application herein, FIG. 4 depicts one embodiment of a thermoelectric generator 106. The generator 106 takes advantage of the thermal differential between opposing surfaces of a material. One surface 406 of the material may be exposed to a relatively hot temperature, while an opposing surface 408 may be exposed to a relatively cold temperature. The amount of electric voltage 304 typically depends on the temperature differential in the bleed air 104 and the ram air 102. While most thermoelectric generators 106 are unable to regulate thermal differentials, the electric voltage 304 provided by the thermoelectric generator 106 within the nitrogen generation system 120 may provide a consistent voltage as the ram air 102 and the bleed air 104 are often received at consistent temperatures. Generally, electrical voltage 304 is generated when the temperature difference is above a threshold value.

As shown in FIG. 4, the thermoelectric generator 202 may include an n-type element 402 and a p-type element 404. Charge may flow through the n-type element 402 and into the p-type element 404 when the bleed air 104 is applied. Generally, electrons in the n-type element 402 may move opposite the direction of current and holes in the p-type element 404 may move in the direction of current, both removing heat from one side 406 of the thermoelectric generator 106 to the other 408. The heat source may drive electrons in the n-type element 402 toward the cooler region, thus creating a current through the thermoelectric generator 106. Holes in the p-type element 404 may then flow in the direction of the current. The current may then be used to power a load, thus converting the thermal energy into electrical energy 304. When both ends 406 and 408 of the thermoelectric generator 106 are kept at a constant temperature difference, there is a constant power flow at a given load condition. Because heat is removed from the bleed air to generate electrical energy 204, the amount of ram air 102 used to cool down the bleed air 104 may be reduced.

The thermoelectric generator 106 described above is one exemplary embodiment and should not be seen in a limiting scope. One skilled in the relevant art will appreciate that there are a many different types of thermoelectric generators 106 that may produce electrical power 304 using temperature differences. Furthermore, the bleed air 104 and the ram air 102 may be interchanged to flow on opposite ends to produce electrical energy 204. For example, ram air 102 may be channeled across end 406, while bleed air 104 may be channeled across end 408.

Figure 5:
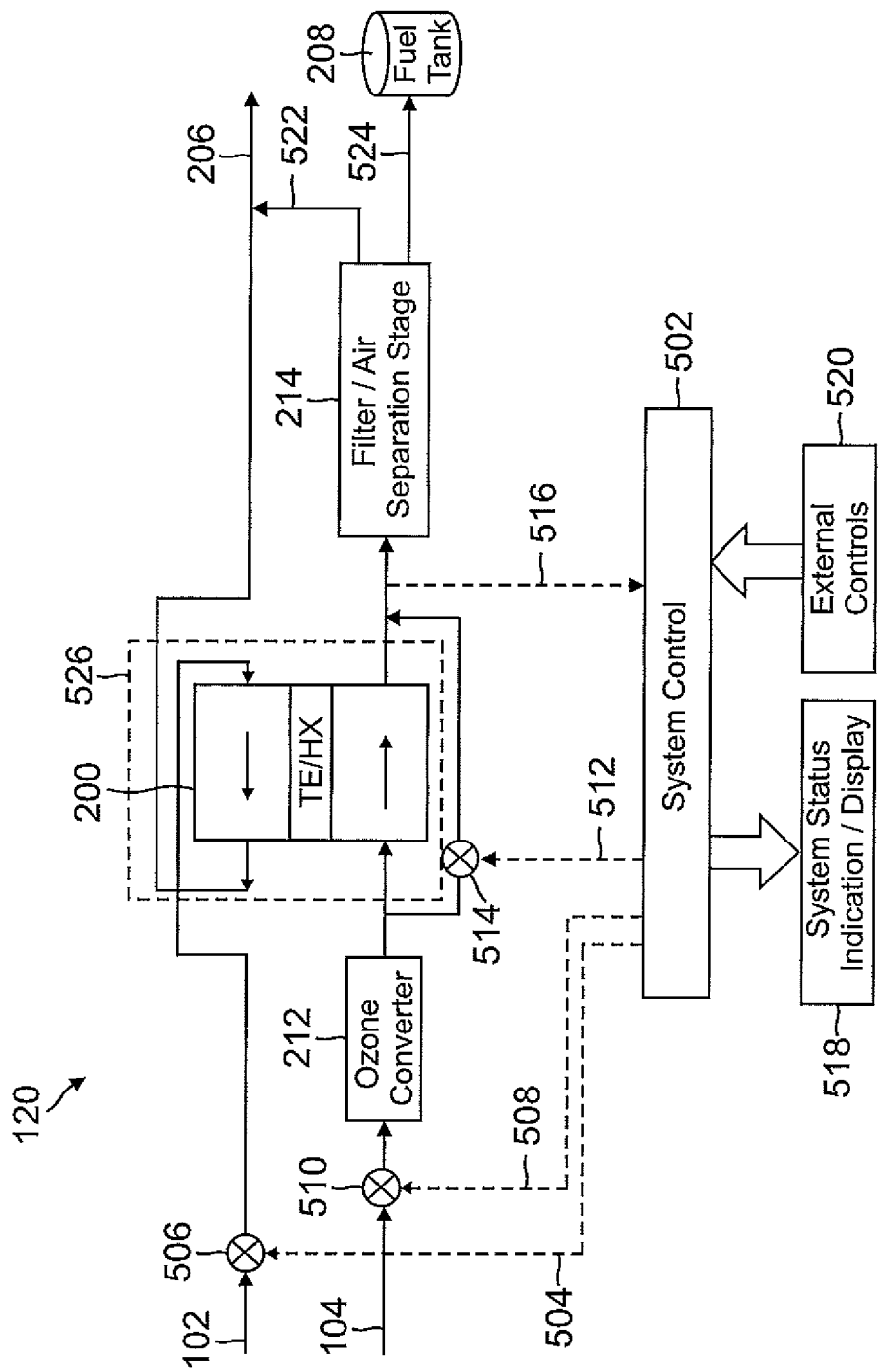
FIG. 5 shows the integration of the thermoelectric generator with air-to-air heat exchanger into an existing nitrogen generation system in accordance with one embodiment.

Now referring to FIG. 5, the thermoelectric generator with the air-to-air heat exchanger 200 is integrated into the nitrogen generation system 120 in accordance with one embodiment. As shown by the dotted line 526, the thermoelectric generator with the air-to-air heat exchanger 200 may be placed into an existing nitrogen generation system 120 or any of the previous systems described above. System control 502 typically requires little to no changes for incorporating the thermoelectric generator with the air-to-air heat exchanger 200.

The system control 502 may maintain and manage controllers through several control lines. In one embodiment, the controllers may be turned off or on. Alternatively, the controllers may be turned on or off to a certain level. For example, controllers may allow 90% of air flow to pass through. The system control 502, in accordance with one embodiment, may be coupled to a ram air controller 506 through line 504. Bleed air control valve 510 may be connected to the system control 502 through line 508 and bypass flow valve 514 may be connected to the system control 502 through line 512.

In operation, a determined amount of ram air 102 and bleed air 104 may be fed into the nitrogen generation system 120. By using control line 504, the system control 502 may increase or reduce the amount of ram air 102 fed into the system 120 through controller 506. As shown, the ram air 102 may be fed directly into the thermoelectric generator with the air-to-air heat exchanger 200 or may be filtered before going to the thermoelectric generator with the air-to-air heat exchanger 200. The ram air 102 may then be expelled through the ram air exhaust 206. As described above, the larger the amount of ram air intake, the more drag typically created within the aircraft.

In addition, control line 508 may be used by the system control 502 to increase or reduce the amount of bleed air 104 fed into the system 120 through control valve 510. Typically, bleed air 104 may come from an engine or motor driven compressor 108. The bleed air 104 may then be fed into the ozone converter 512 as depicted in FIG. 5.

While the bleed air 104 still maintains its high temperature, the ozone converter 212 may reduce the levels of ozone within the bleed air 104. The bleed air 104 may be passed through the thermoelectric generator with the air-to-air heat exchanger 200 or the thermoelectric generator with the air-to-air heat exchanger 200 may be bypassed altogether dependent on the bypass flow valve 514 and control line 512. To determine whether the thermoelectric generator with the air-to-air heat exchanger 200 may be bypassed, the system control 502 may include a temperature monitoring line 516. Typically, when the bleed air 104 is cool enough to be separated, the thermoelectric generator with the air-to-air heat exchanger 200 may be bypassed using bypass flow valve 514 and control line 512. Alternatively, when the bleed air 104 is not cool enough, the bypass flow valve 514 may prevent bleed air 104 from flowing through causing the bleed air 104 to flow through the thermoelectric generator with the air-to-air heat exchanger 200. In essence, the bypass flow valve 514 may monitor and control the temperature of the bleed air 104 provided to the filter/air separation stage 214.

While the bypass flow valve 514 along with control line 512 may be used to monitored the temperature of the bleed air 104, one skilled in the relevant art will appreciate that there are a number of ways to ensure that the filter/air separation stage 214 is provided with bleed air 104 having the correct temperature. In one embodiment, the system control 502 may reduce or increase the amount of bleed air 104 coming through bleed air control valve 510 using control line 508. Alternatively, the amount of ram air 102 may be regulated by ram air controller 506 through line 504.

After the bleed air 104 is cooled, the bleed air 104 may be fed into the filter/air separation stage 214 where the bleed air 104 may be separated into oxygen enriched air 522 and nitrogen enriched air 524. The oxygen enriched air 522 may be provided as exhaust 106 while the nitrogen enriched air 524 may be placed in a fuel tank 208, which as described earlier may remove volatile combinations of oxygen, fuel vapors, and ignition sources.

In typical embodiments, the system control 502 may indicate system status through a display 518. The system control 502 may also be managed and manipulated through external controls 520. System control 502 may take the form of an entirely hardware embodiment, an entirely software embodiment, or an embodiment containing both hardware and software elements. In one embodiment, the system control 502 is implemented in software, which includes but is not limited to firmware, resident software, microcode, etc. The hardware may include a processing unit, a system memory, and a system bus that operatively couples various system components.

Figure 6:
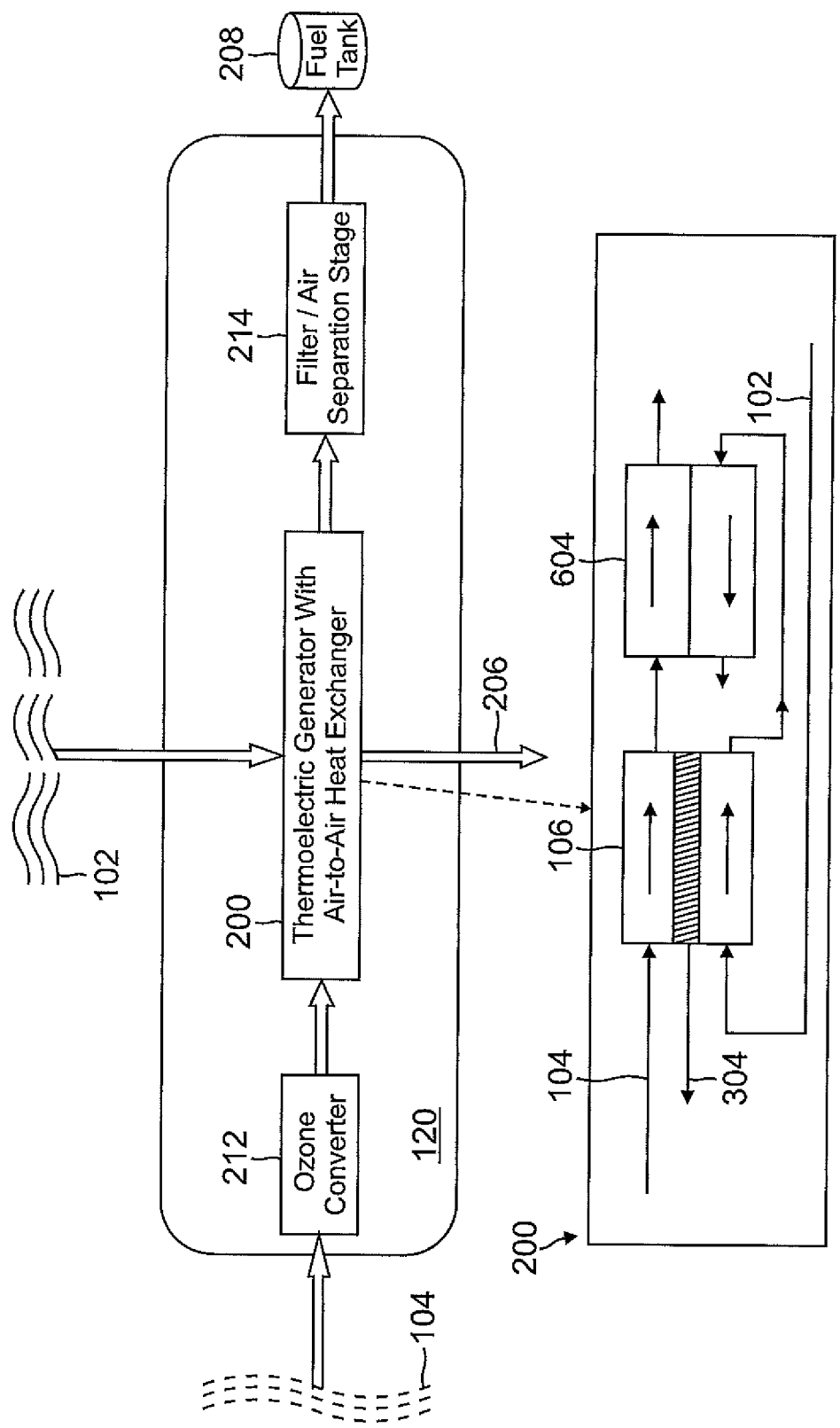
FIG. 6 provides a block diagram illustrating a system architecture splitting the thermoelectric generator and air-to-air heat exchanger in accordance with one embodiment.

Previously, the thermoelectric generator with the air-to-air heat exchanger 200 was described as a single unit. FIG. 6 provides a block diagram illustrating a system architecture splitting the thermoelectric generator 106 and air-to-air heat exchanger 604 in accordance with another embodiment. The nitrogen generation system 120 may receive ram air 102 and bleed air 104 and expel ram air exhaust 206 and provide nitrogen enriched air to a fuel tank 208.

As shown, the thermoelectric generator with the air-to-air heat exchanger 200 is expanded. The ram air 102, indicated on the lower portion of the expanded section, may be first channeled through the thermoelectric generator 106 and then through a counter-flow air-to-air heat exchanger 604. The bleed air 104, provided on the top portion of the expanded portion, may be first provided to the thermoelectric generator 106. Following, the bleed air 104 may be fed to the air-to-air heat exchanger 604.

Typically, the relative air flow directions of ram air 102 and bleed air 104 may result in different temperature differentials in the course of flow, therefore it may have different electrical power 304 production. Using the ram air 102, the bleed air 104 may be cooled to a temperature suitable for the filter/air separation stage 114 whereby the nitrogen generation system 110 separates the air into nitrogen and oxygen enriched fractions.

Figure 6A:
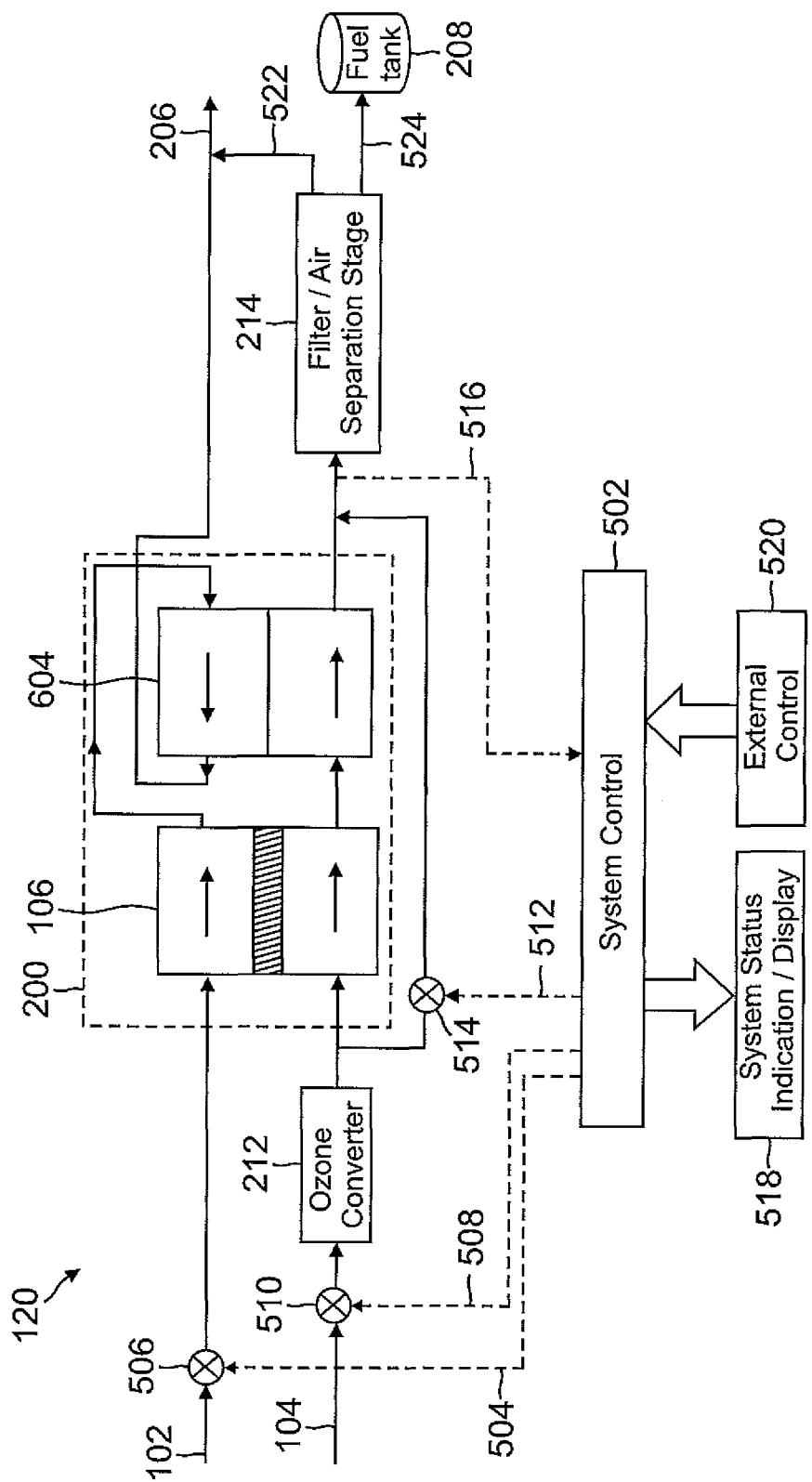
FIG. 6A depicts the integration of exemplary channeling within the nitrogen generation system in accordance with one embodiment.

FIG. 6A depicts the integration of the exemplary channeling for the ram air 102 and the bleed air 104 into the nitrogen generation system 120 in accordance with one embodiment. As shown, the controllers and control lines are similar to those described before. In the illustration, the bleed air 102 may be fed into the thermoelectric generator 106 first and then through the air-to-air heat exchanger 604. The ram air 104 may be channeled first through the thermoelectric generator 106 and then through the counter-flow air-to-air heat exchanger 604. Power may be produced by the thermoelectric generator 106 as a result of the temperature differential of the bleed air 104 and the ram air 102. Because the thermoelectric generator 106 reduces some of the heat within the bleed air 104, the amount of ram air 102 to cool down the bleed air 104 may be reduced.

FIGS. 6 and 6A show illustrative channeling to feed the ram air 102 and bleed air 104 first to the thermoelectric generator 106 and then to the air-to-air heat exchanger 604. One skilled in the relevant art will appreciate that there may be a number of different ways to channel the ram air 102 and the bleed air 104 within the nitrogen generation system 120.

Figure 7:
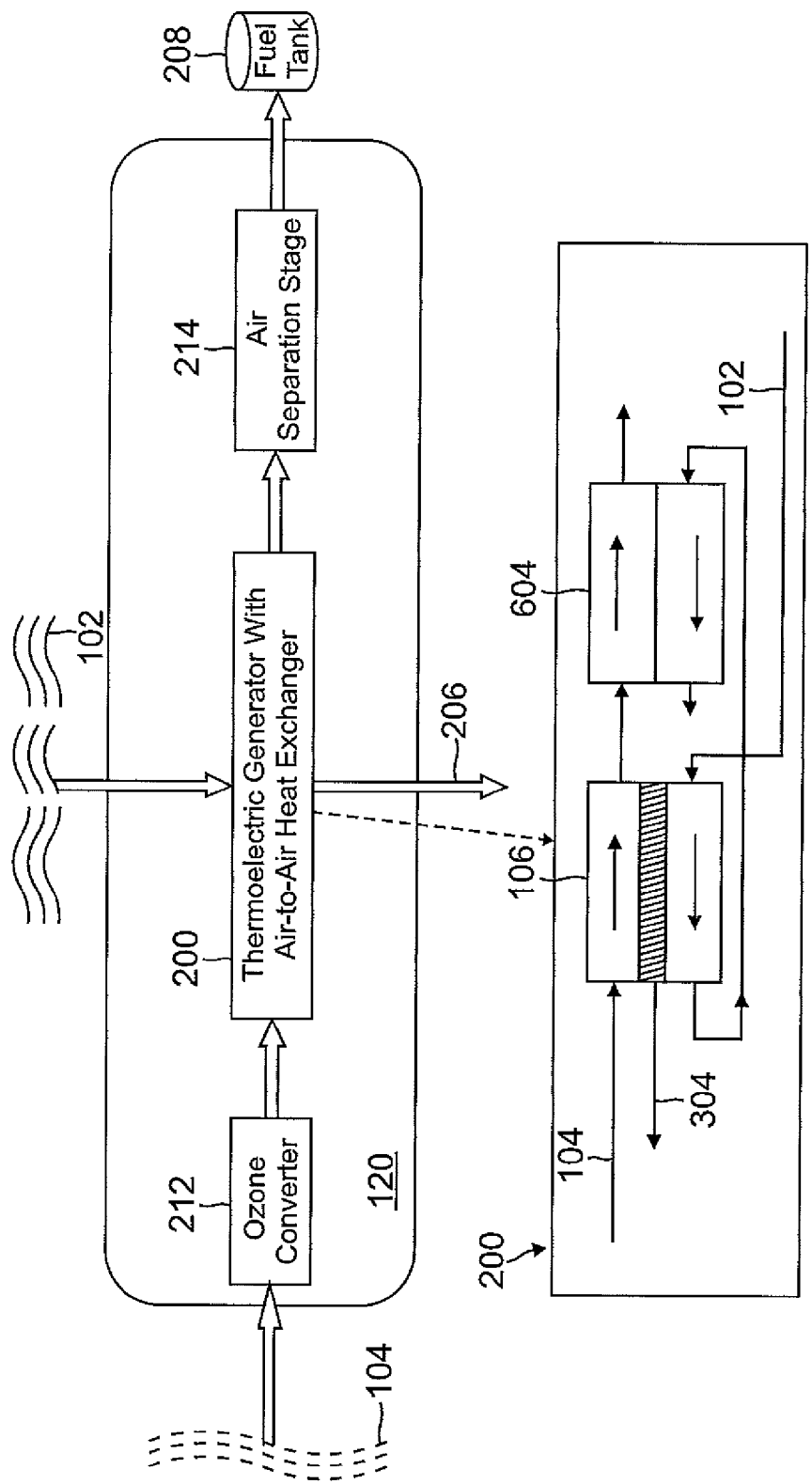
FIG. 7 provides a block diagram illustrating a system architecture splitting the thermoelectric generator and air-to-air heat exchanger in accordance with one embodiment.

FIG. 7 provides a block diagram illustrating a system architecture for an alternative channeling of the bleed air 104 and ram air 102 in accordance with one embodiment. Generally, the nitrogen generation system 120 may receive ram air 102 and bleed air 104 and expel ram air exhaust 206 and provide nitrogen enriched air to a fuel tank 208. The thermoelectric generator with the air-to-air heat exchanger 200 is expanded as shown. The ram air 102, indicated on the lower portion of the expanded section, may be first channeled through the backside of the thermoelectric generator 106 and then through the backside of the air-to-air heat exchanger 604.

In addition, the bleed air 104, provided on the top of the expanded portion, may first be provided to the thermoelectric generator 106. Following, the bleed air 104 may be fed to the air-to-air heat exchanger 604. The thermoelectric generator 106 may produce electrical energy 304 and the air-to-air exchanger 604 may cool the bleed air 104 for the filter/air separation stage 214 whereby the nitrogen generation system 120 separates the air into nitrogen and oxygen enriched fractions.

Figure 7A:
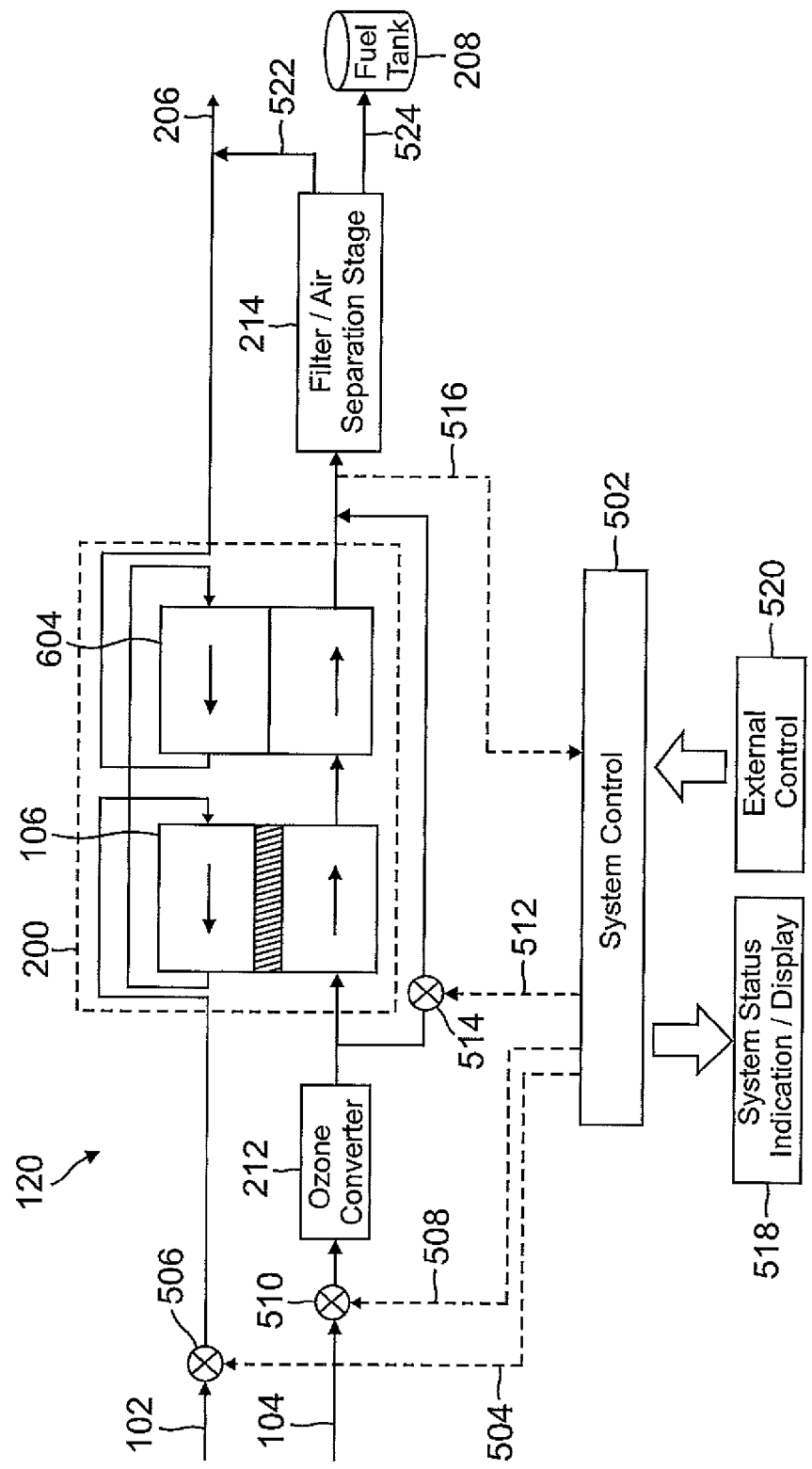
FIG. 7A depicts the integration of exemplary channeling within the nitrogen generation system in accordance with one embodiment.

FIG. 7A depicts the integration of an alternative channeling into the nitrogen generation system 120 in accordance with one embodiment. In the illustration, the bleed air 104 may be fed into the thermoelectric generator 106 first and then through the air-to-air heat exchanger 604. The ram air 104 may be channeled first through the backside of the thermoelectric generator 106 and then through the backside of the air-to-air heat exchanger 604. Electrical power 304 may be produced by the thermoelectric generator 106 as a result of the temperature differential of the bleed air 104 and the ram air 102. Because the thermoelectric generator 106 reduces some of the heat within the bleed air 104, the amount of ram air 102 to cool down the bleed air 104 may be reduced.

While two examples of channeling the ram air 102 and the bleed air 104 were shown, one skilled in the relevant art will appreciate that there are numerous configurations in channeling the air flow. Furthermore, the air-to-air heat exchanger 604 and the thermoelectric generator 106, as previously shown, do not have to be separated, but instead may be incorporated into the same structure.

FIGS. 8A and 8B depict one embodiment of a thermoelectric generator 106. As depicted in FIG. 8A, the thermoelectric generator 106 may include an inside tube 804 and an outside tube 806 with a thermoelectric element 802 between them. The thermoelectric generator 106 may receive ram air 102 through one end and bleed air 104 through the other. Using the temperature differential, the thermoelectric generator 202 may produce electrical energy 304.

FIG. 8B is a sectional side view of the thermoelectric generator 106 in accordance with one embodiment. As shown, the ram air 102 may be sent through the outside tube 806 while the bleed air 104 may be sent through the inside tube 804. Between the outside tube 806 and the inside tube 804 may be thermoelectric elements 802 to generate electrical power 304. While the ram air 102 may be provided through the outer tube 806 and the bleed air 104 within the inner tube 804, they may be interchanged. Furthermore, the air flow may be switched depending on the channeling described above.

Figure 9A:
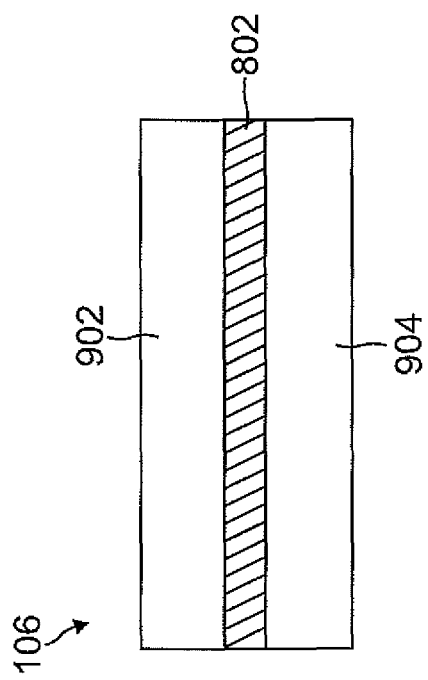
FIG. 9A is a sectional side view of a thermoelectric generator in accordance with one embodiment.
Figure 9B:
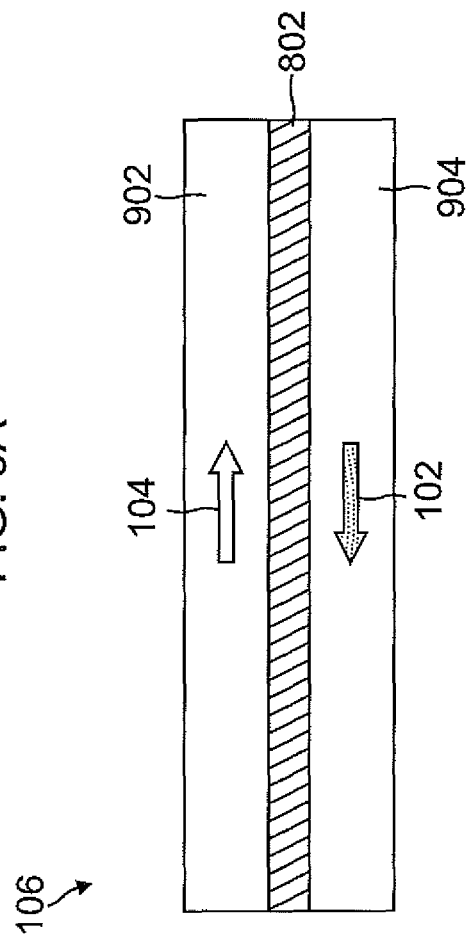
FIG. 9B depicts a typical operation of the thermoelectric generator in accordance with one embodiment.

FIG. 9A is a sectional side view of another thermoelectric generator 106. As shown, the thermoelectric generator 106 may have one end 902 and a second end 904. Separating each end may be a thermoelectric element 802. As shown in FIG. 9B, bleed air 104 may pass over end 902, while ram air may pass over end 904 so that the thermoelectric element 802 may generated electrical power 304. Each of the thermoelectric generators 106 can be provided within any system described above including, but not limited to, the systems shown in FIG. 1.

While embodiments of the disclosure have been described in terms of various specific embodiments, those skilled in the art will recognize that the embodiments of the disclosure can be practiced with modifications within the spirit and scope of the claims.

What is claimed is:

1. A device for producing electrical power in an aircraft comprising:
    a bleed air system bleeding air from one of an engine or compressor;
    a thermoelectric device coupled to said bleed air system for generating said electrical power using temperature differentials between ram air and bleed air;
    the thermoelectric device including an air-to-air heat exchanger receiving said ram air and said bleed air;
    a bypass line for routing bleed air around the thermoelectric device; and
    a system control coupled to the ram air and the bleed air to control a temperature of the bleed air and to control a temperature gradient of the thermoelectric device by selectively bypassing bleed air around the thermoelectric device.

2. The device of claim 1, wherein said bleed air system comprises:
    an ozone converter for reducing ozone levels within said bleed air;
    the air-to-air heat exchanger receiving said ram air and said bleed air from said ozone converter, wherein said ram air cools said bleed air; and
    an air separator receiving said cooled bleed air, wherein said air separator separates said cooled bleed air into nitrogen and oxygen enriched fractions.

3. The device of claim 2, further comprising a fuel tank for said nitrogen enriched fraction.

4. The device of claim 1, wherein said bleed air provides a heat source and said ram air provides a cold source to create said temperature differentials.

5. The device of claim 1, wherein said electrical power is generated from said thermoelectric device when said temperature differential is above a threshold value.

6. The device of claim 2, further comprising a bypass flow valve coupled to the air separator to allow the bleed air to be passed through the air-to-air heat exchanger or bypass the air-to-air heat exchanger based on a temperature of the bleed air.

7. The device of claim 1, wherein said system control displays a system status.

8. A method for generating power on an aircraft bleed system comprising:
    receiving ram air;
    receiving bleed air from one of an engine or compressor;
    directing said ram air and said bleed air through a thermoelectric cell coupled to said aircraft bleed system for generating electrical energy, the thermoelectric cell including an air-to-air heat exchanger receiving said ram air and said bleed air;
    a bypass line for routing bleed air around the thermoelectric cell; and
    controlling a temperature of the bleed air and a temperature gradient of the thermoelectric device by selectively bypassing bleed air around the thermoelectric cell.

9. The method of claim 8, further comprising cooling said bleed air by said thermoelectric cell reducing an amount of ram air used by said aircraft bleed system.

10. The method of claim 9, wherein reducing an amount of ram air decreases air drag.

11. The method of claim 9, wherein cooling said bleed air further comprises cooling said bleed air to about 230° C.

12. The method of claim 8, further comprising coupling the thermoelectric cell to a nitrogen generation system.

13. A system for producing electrical power in an aircraft comprising:
    a thermoelectric device with an air-to-air heat exchanger receiving bleed air from one of an engine or compressor, wherein said thermoelectric device produces electrical energy from a temperature difference between said bleed air and ram air while cooling said bleed air;
    a bypass line for routing bleed air around the thermoelectric device; and
    a system control coupled to the ram air and the bleed air to control a temperature of the bleed air and to control a temperature gradient of the thermoelectric device by selectively bypassing bleed air around the thermoelectric device.

14. The system of claim 13, wherein said air-to-air heat exchanger cools said bleed air using said ram air.

15. The system of claim 13, further comprising the system control controlling ram air flow and bleed air flow.

16. The system of claim 13, further comprising a nitrogen generation system coupled to said thermoelectric device.

17. The system device of claim 16, wherein said nitrogen generation system comprises:
    an ozone converter for reducing ozone levels within said bleed air;
    the air-to-air heat exchanger receiving said ram air and said bleed air from said ozone converter, wherein said ram air cools said bleed air; and
    an air separator receiving said cooled bleed air, wherein said air separator separates said cooled bleed air into nitrogen and oxygen enriched fractions.

\* \* \* \* \*